(12) United States Patent
Lazzara (10) Patent No.: US 8,249,759 B2
(45) Date of Patent: Aug. 21, 2012

(54) T-HARNESS CONNECTION FOR VEHICLE REMOTE STARTERS

(75) Inventor: Robert K. Lazzara, Chicago, IL (US)

(73) Assignee: PSI Patents, LLC, Chicago, IL (US)

( * ) Notice: Subject to any disclaimer, the term of this patent is extended or adjusted under 35 U.S.C. 154(b) by 0 days.

(21) Appl. No.: 13/271,330

(22) Filed: Oct. 12, 2011

(65) Prior Publication Data

US 2012/0029733 A1 Feb. 2, 2012

Related U.S. Application Data

(63) Continuation of application No. 13/123,729, filed as application No. PCT/US2010/021644 on Jan. 21, 2010, now abandoned.

(60) Provisional application No. 61/147,364, filed on Jan. 26, 2009.

(51) Int. Cl.
*G06F 7/00* (2006.01)
*B60R 22/00* (2006.01)

(52) U.S. Cl. ........ 701/2; 307/10.6; 180/287; 340/539.1; 340/10.22; 340/5.64

(58) Field of Classification Search ................ 701/2, 36; 307/10.6; 340/426.13, 426.16, 425.5, 531, 340/5.64, 539.1; 180/287
See application file for complete search history.

(56) References Cited

U.S. PATENT DOCUMENTS

| | | | |
|---|---|---|---|
| 6,529,124 B2* | 3/2003 | Flick | 340/426.1 |
| 6,677,854 B2* | 1/2004 | Dix | 340/438 |
| 6,700,220 B2 | 3/2004 | Bayeur et al. | |
| 7,245,997 B2* | 7/2007 | Kitao et al. | 701/29.1 |
| 7,725,129 B2* | 5/2010 | Grunhold | 455/556.1 |
| 2001/0029415 A1* | 10/2001 | Flick | 701/36 |
| 2005/0012593 A1 | 1/2005 | Harrod et al. | |
| 2007/0100513 A1* | 5/2007 | Asano | 701/2 |
| 2007/0112492 A1* | 5/2007 | Hyodo et al. | 701/49 |
| 2009/0079552 A1* | 3/2009 | Flick | 340/426.17 |

(Continued)

FOREIGN PATENT DOCUMENTS

CA 2601442 A1 * 3/2008

(Continued)

OTHER PUBLICATIONS

A Remote and Sensorless Stator Winding Resistance Estimation Method for Thermal Protection of Soft-Starter-Connected Induction Machines; Pinjia Zhang; Bin Lu; Habetler, T.G.; Industrial Electronics, IEEE Transactions on; vol. 55 , Issue: 10 Digital Object Identifier: 10.1109/TIE.2008.927241; Publication Year: 2008 , pp. 3611-3618.*

(Continued)

*Primary Examiner* — Cuong H Nguyen
(74) *Attorney, Agent, or Firm* — Adam K. Sacharoff (57) ABSTRACT

In one embodiment there is a remote starter system for a vehicle having an ignition connected to vehicle controllers by a serial data interface. The remote starter system includes a T-Harness connector having at least a first, second, and third serial data connectors and a remote starter module. The remote starter module having at least a remote starter connector, wherein the first serial data connector of the T-Harness connector is coupled to the remote starter connector, and the second and third serial data connectors are separately coupled between the pair of interconnected vehicle serial data connectors. Data from the remote starter module is thereby communicated to the vehicle controller modules and the ignition module.

20 Claims, 4 Drawing Sheets

U.S. PATENT DOCUMENTS

| | | | | |
|---|---|---|---|---|
| 2011/0205017 A1* | 8/2011 | Lazzara | | 340/5.64 |
| 2011/0251736 A1* | 10/2011 | Lazzara | | 701/2 |
| 2012/0029733 A1* | 2/2012 | Lazzara | | 701/2 |
| 2012/0029734 A1* | 2/2012 | Lazzara | | 701/2 |

FOREIGN PATENT DOCUMENTS

| | | | |
|---|---|---|---|
| CA | 2741092 A1 * | 7/2010 | |
| CA | 2741093 A1 * | 8/2010 | |
| WO | WO 2008140529 A1 * | 11/2008 | |
| WO | WO 2010085557 A1 * | 7/2010 | |
| WO | WO 2010091172 A1 * | 8/2010 | |

OTHER PUBLICATIONS

A Remote and Sensorless Thermal Protection Scheme for Soft-Starter-Connected Induction Motors; Pinjia Zhang; Yi Du; Bin Lu; Habetler, T.G.; Industry Applications Society Annual Meeting, 2008. IAS '08. IEEE; Digital Object Identifier: 10.1109/08IAS.2008.48 Publication Year: 2008 , pp. 1-7.*

Remote vehicle state of health monitoring and its application to vehicle no-start prediction; Yilu Zhang; Salman, M.; Subramania, H.S.; Edwards, R.; Correia, J.; Gantt, G.W.; Rychlinksi, M.; Stanford, J.; AUTOTESTCON, 2009 IEEE; Digital Object Identifier: 10.1109/AUTEST.2009.5314011; Publication Year: 2009 , pp. 88-93.*

A DC Signal Injection-Based Thermal Protection Scheme for Soft-Starter-Connected Induction Motors; Pinjia Zhang; Yi Du; Bin Lu; Habetler, T.G.; Industry Applications, IEEE Transactions on; vol. 45 , Issue: 4; Digital Object Identifier: 10.1109/TIA.2009.2023410; Publication Year: 2009 , pp. 1351-1358.*

Hardware design on electric vehicle LCD display system based on CAN bus; Yu Zhilong; Li Dongsheng; He Long; Wang Haiying Strategic Technology (IFOST), 2011 6th International Forum on; vol. 1; Digital Object Identifier: 10.1109/IFOST.2011.6021023 Publication Year: 2011 , pp. 283-286.*

The implementation of serial communication technology in the vehicle alcohol lock; Qian Wang; Huayong Ge; Mingsheng Huang Image and Signal Processing (CISP), 2011 4th International Congress on; vol. 5; Digital Object Identifier: 10.1109/CISP.2011.6100738; Publication Year: 2011 , pp. 2828-2831.*

Vehicle serial networks; Nightingale, M.J.; Woodhouse, R.G.; Vehicle Networks for Multiplexing and Data Communication, IEE Colloquium on; Publication Year: 1988 , pp. 2/1-2/3.*

\A simplified serial communication network within a vehicle; Harata, Y.; Nishimura, Y.; Kimura, M.; Nagase, H.; Takigawa, M. Vehicular Technology Conference, 1989, IEEE 39$^{th}$; Digital Object Identifier: 10.1109/VETEC.1989.40110 Publication Year: 1989 , pp. 437-442 vol. 1.*

Simplify your HV—harness—Uniform high current connectors for batteries, inverters and motors in heavy-duty vehicles and passenger cars; Schilla, T.; Schuster, M.; Emobility—Electrical Power Train, 2010; Digital Object Identifier: 10.1109/EMOBILITY.2010.5668059; Publication Year: 2010 , pp. 1-6.*

Distributed Communication System Design Based on Can Bus for Parallel-Serial Hybrid Electrical Vehicles; Yi-He Zuo; Chang-Le Xiang; Qing-Dong Yan; Wei-Da Wang; Hui Liu; Hong-Cai Li; Information Science and Applications (ICISA), 2010 International Conference on; Digital Object Identifier: 10.1109/ICISA.2010.5480584;Pub. Yr: 2010 , pp. 1-8.*

A serial hybrid bus with methanol-hydrogen engine; Liqing Sun; Ruchuan Liang; Qingcai Wang; Vehicle Power and Propulsion Conference, 2008. VPPC '08. IEEE; Digital Object Identifier: 10.1109/VPPC.2008.4677572; Publication Year: 2008, pp. 1-4.*

Design of link layer controller for high speed serial bus;YuYun; Wang Danghui; Yang Ke; Feng Zhihua; Information Science and Engineering (ICISE), 2010 2nd International Conference on; Digital Object Identifier: 10.1109/ICISE.2010.5689943 Publication Year: 2010 , pp. 1997-2000.*

Gammage, "Using CAN BUS TO Integrate Aftermarket Vehicle Security System," Auto Electronics, pp. 25-29m, Mar./Apr. 2006.

* cited by examiner

T-HARNESS CONNECTION FOR VEHICLE REMOTE STARTERS

CROSS REFERENCE TO RELATED APPLICATIONS

The present application is a continuation application of U.S. patent application Ser. No. 13/123,729 filed Apr. 12, 2011, which is related to international application of PCT/US10/21644 filed Jan. 21, 2010 which claims priority to U.S. Provisional Application 61/147,364 filed Jan. 26, 2009. Each of which is incorporated herein by reference.

FIELD OF THE INVENTION

The present invention relates to the field of automotive convenience starters, also known as remote engine starters, and more particularly to a quick-connect T-harness that allows fast installation and proper routing of vehicle data signals to associated controllers.

BACKGROUND OF THE INVENTION

Vehicle Remote Starters are a common and valuable possession for many vehicle owners. The remote starter system allows the vehicle owner that lives in a climate that is unusually warm or cold to start their engine for a predetermined amount of time and allow interior temperature of the vehicle to stabilize to a comfortable level. Vehicle remote starters consist of an electronics module that connects into the vehicle at various points and controls various vehicle functions by applying voltage to discrete wires to control various aspects of the vehicle operation. For example, a wire might be connected to the heater or air conditioning supply line and when voltage is applied the heater or air conditioning unit will activate and begin to climate control the vehicle interior.

The installation of the remote starter is typically performed by a technician that routes the individual wires from a remote starter module to each target wire that corresponds to a circuit in the vehicle that requires control. These wires are then connected to the circuit using a variety of methods, but most typically the process used is to remove a small section of the insulation covering the wire and then soldering the remote starter wire to the target wire using heat and a lead based solder. The connection is then covered over with insulating tape which protects the connection and prevents unintended electrical contact with any exposed metal surfaces. This prior art described method of attachment is labor intensive and normally a better solution is to devise a quick connect system that eliminates the need to solder and tape the wire connections.

Figure 1:
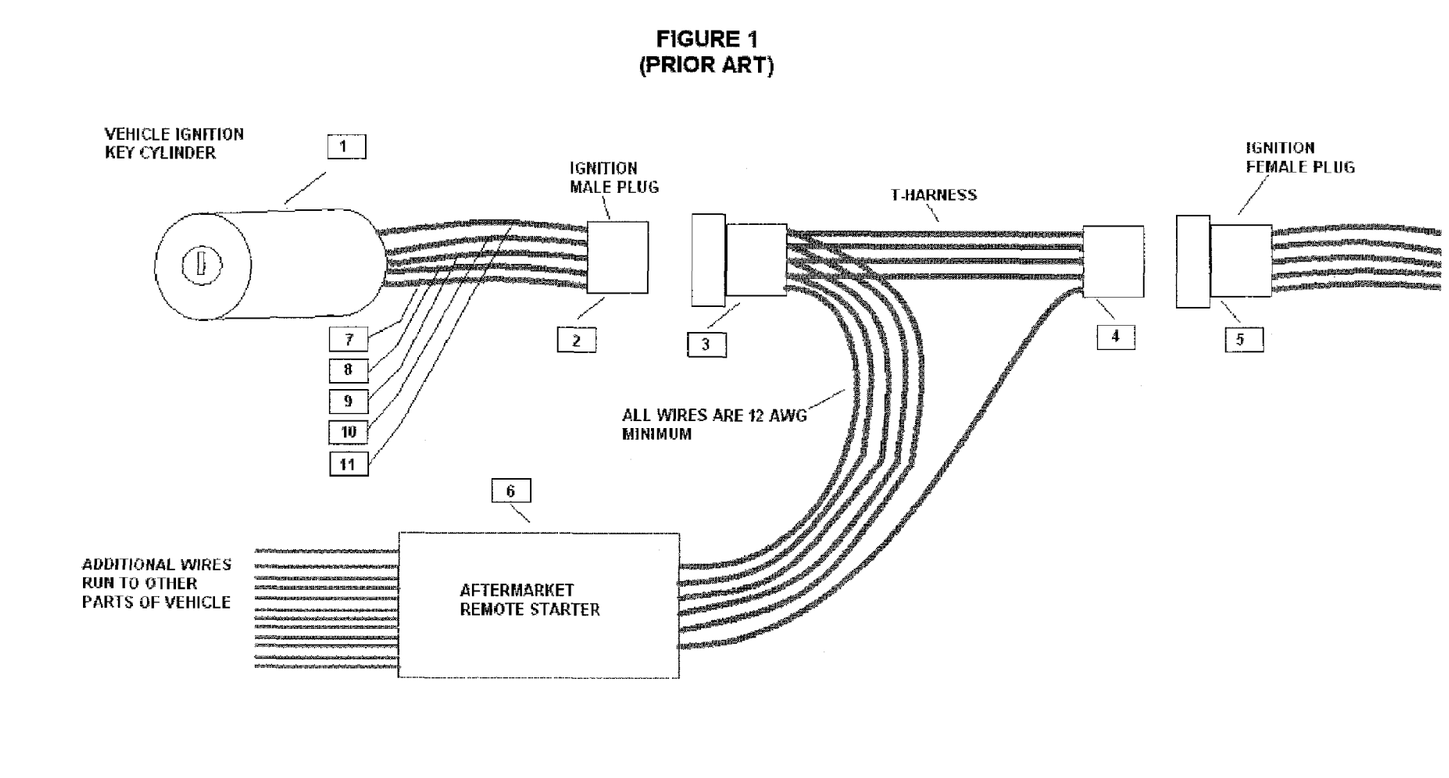
FIG. 1 is a drawing that describes a prior art vehicle T-Harness system and its operation.
Figure 2:
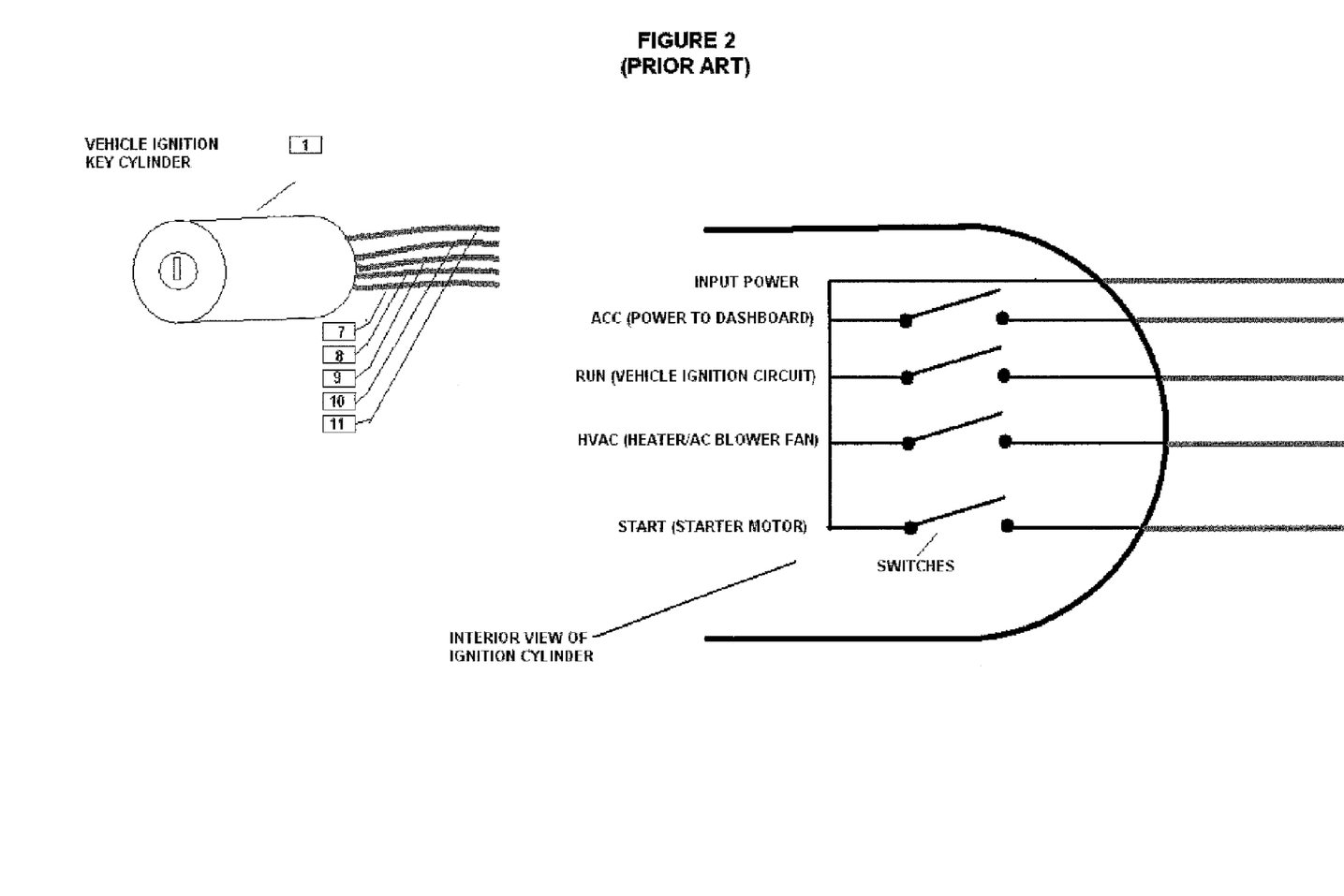
FIG. 2 is a schematic diagram of the prior art system in FIG. 1 that shows the internal operation of the key cylinder.

For the purpose of the invention, prior art is briefly examined here, more specifically FIGS. 1 and 2 which describe a T-Harness system that was occasionally used to facilitate quicker installation of a subset of the remote starter wiring. The system in FIG. 1 describes a typical vehicle ignition system and its related connections including the connections made to the remote starter system. This includes the vehicle ignition cylinder 1, including a small length of wires and a connection plug 2 which provides a separation point for removal of the cylinder. The connection plug normally mates with its female counterpart 5 which attaches to the vehicle engine control systems and other related vehicle systems. When a remote starter 6 is installed, the T-Harness 12 is used to bridge the vehicle connectors for the purpose of providing connection points for the remote starter wires. This is accomplished using mating connectors 3,4 which match with the vehicle connectors and provide a subset of the wiring connections needed for the remote starter system.

The T-Harness allows the remote starter system to activate specific circuits in the vehicle 7-10 which control various functions including activation of the heater and air conditioning systems, the engine controller, the starter motor, and the vehicle accessories circuit. In addition the T-Harness allows access to the vehicle power feed by using the same wire 11 that powers the vehicle circuits normally. To further understand how the remote starter controls these circuits, further prior art provides a description of the function of a typical vehicle key cylinder as shown in FIG. 2. The drawing in FIG. 2 shows a schematic view of the ignition cylinder and describes the operation of the circuits that are activated when the operator inserts the key and rotates it in the cylinder. The actual function of the ignition cylinder is basically an array of switches which are closed depending on the position of the key. For example if the operator turns the key one "click" or position, one switch is closed. Further rotating the key then closes another switch and so on. The switches relate to the remote starter in that the remote starter module provides the same activation to these vehicle circuits through the T-Harness.

Surprisingly, the described T-Harness has failed to gain commercial or market acceptance. Remote starter installers still prefer to use the older method of attaching wires directly using soldering. There are a few reasons for this: First, the cost of the T-Harness can be expensive due to the large size of the wiring and connectors. The reason for this is because the vehicle ignition circuits require a prodigious amount of power to feed all of the vehicle electrical needs and as a result wires and connectors are made large enough to handle the electrical load. This results in the T-Harness needing the same large and expensive connector and wires which results in a large associated cost. Secondly, if the installer uses the T-Harness, the use of physical attachment of wires is still needed as a typical remote starter system might have thirty to thirty-five different wires that must be connected. As a result the installer of the remote starter system will still need to perform the soldering attachment operation and this makes the T-Harness less desirable since it does not eliminate the need to solder connections.

SUMMARY OF THE INVENTION

To overcome the deficiencies of prior art, one or more embodiments of the described invention relate to changes in the way vehicle ignition systems and wiring function on the newest and most modern vehicles. Specifically a modern vehicle dispenses with the discreet wiring previously described and instead uses serial data lines to convey data and changes in the vehicle state to other parts of the vehicle. A serial data line is a single or multiple wire connection that presents information as a series of voltage pulses related by time. Common types of vehicle serial data protocols are canbus, flexray, most, linbus, and rs232. For example, in the prior art description the heater or air conditioning system, engine, starter, and accessories circuits each had a single discrete wire that convey data by simply changing voltage state. The presence of voltage on the wire would indicate that the circuit was active. A vehicle with a serial data system will instead combine or multiplex those signals, each conveying a different vehicle state or item of data along with hundreds or even thousands of other signals onto one or two wires.

In a modern vehicle this presents a unique opportunity to create a new invention: a T-Harness connector that allows an entire remote starter system to be installed at one physical connection point in a quick and safe manner. In one embodiment a modern vehicle ignition system, T-Harness connector, and remote starter system. The system is comprised of an electronic ignition module with its male plug, a corresponding female plug, power wires or leads, and serial data wires or leads. In the system, the ignition cylinder is actually an electronic device. The key cylinder still controls switches but these switches are then read by an electronic microcontroller which then translates the signals to data packets that are sent along the serial data lines to various other electronic devices throughout the vehicle. An example of one such device is an engine controller. The ignition module senses the key is turned and sends data that indicates "Start the Engine" along the serial data lines. The engine controller then receives this data and correspondingly starts the engine.

The use of serial data lines to transfer data around the vehicle allows the remote starter system to be easily installed in the vehicle using the embodied invention. As all data is transmitted along the serial data lines, the remote starter module can be inserted at only one point along the serial data line and allow the remote starter module to receive and send all necessary information needed to operate the vehicle and start the engine. The serial data T-Harness connector is used to route the serial data lines from the electronic ignition cylinder to the remote starter module. Additionally the serial data T-Harness connector routes signals from the remote starter module to other modules in the vehicle. Finally, note that the serial data T-Harness connector also accesses the same power wires or leads normally used to power the electronic ignition cylinder and uses this power to further power the remote starter module. Thus the T-Harness connector allows a complete remote starter system to be easily and quickly installed in a vehicle without any need for further wire connections.

Additionally vehicle serial data wires, leads, or lines are very susceptible to poor connections made by inexperienced installers. If the wiring is not soldered correctly, the connection may appear to function correctly but will intermittently fail and cause improper operation of the vehicle. The serial data T-Harness connector resolves this issue by using only the connection points provided by the vehicle manufacturer and by using matching plugs.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the claims by the embodiments illustrated.

Figure 3:
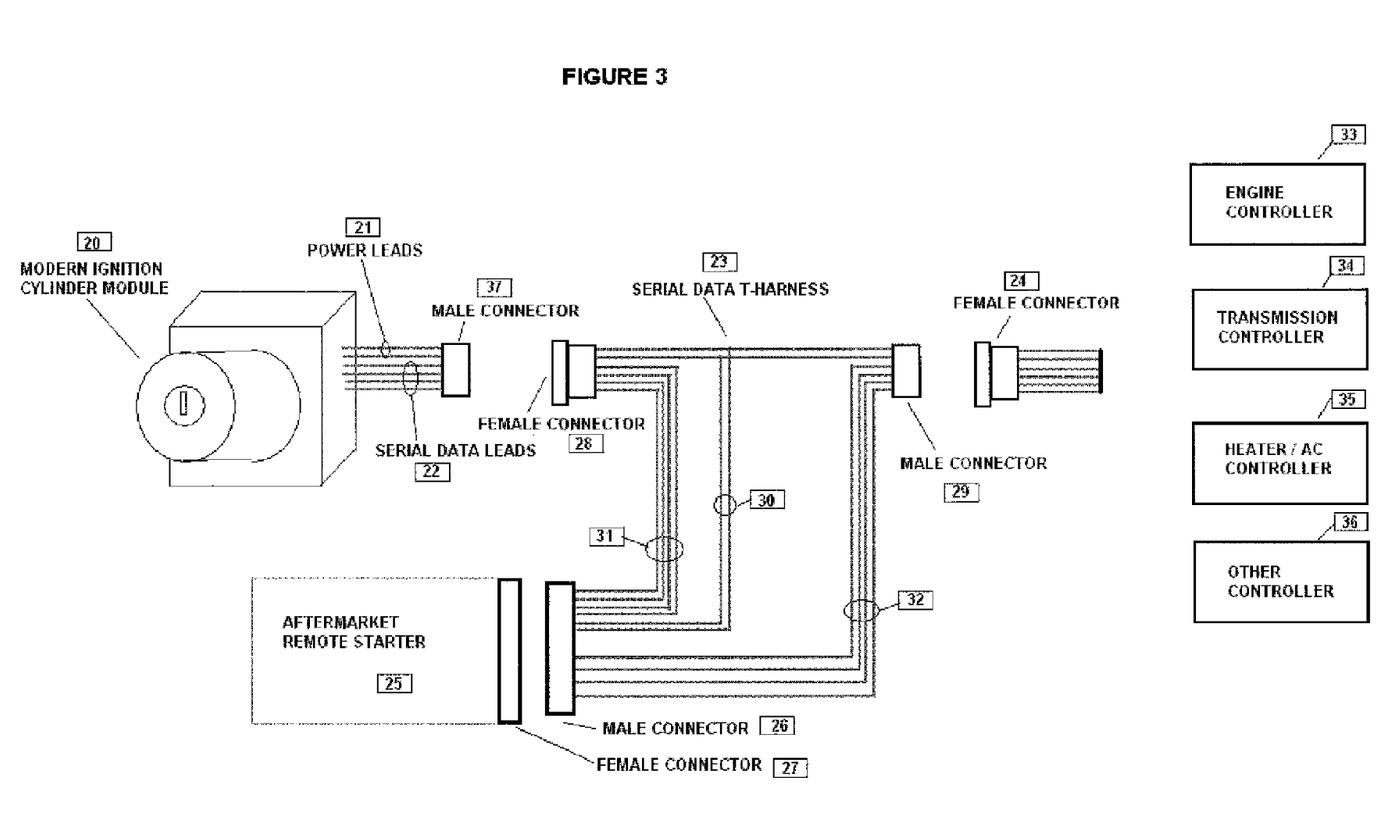
FIG. 3 is a drawing of the embodied invention as well as the operation and its related connections into a modern vehicle.

The present invention provides a simple, quick and convenient method to facilitate the installation of a remote starter system into modern vehicles that use serial data lines for vehicle control along with an electronic ignition cylinder. Referring now to FIG. 3, which depicts the embodied invention as installed in a vehicle.

In one embodiment, a modern vehicle ignition system, a T-Harness connector, and remote starter system is provided. The vehicle ignition system is comprised of an electronic ignition module 20 with a male plug 37 and a corresponding female plug 24. The plugs connect power leads or wires 21 and serial data leads or wires 22 from the electronic ignition module 20 to other vehicle controller modules. In one system, the ignition cylinder is an electronic device. The key cylinder still controls switches but these switches are then read by an electronic microcontrollers which then translate the signals to data packets that are sent along the serial data lines to various other electronic devices throughout the vehicle. An example of one such device is the engine controller. The ignition module senses the key is turned and sends data that indicates "Start the engine" along the serial data lines. The engine controller then receives this data and correspondingly starts the engine.

The use of the serial data lines 22 to transfer data around the vehicle allows the remote starter system 100 to be easily installed in the vehicle. As all data is transmitted along the serial data lines 22, the remote starter module 25 can be inserted at a single point along the serial data line which allows the remote starter module 25 to receive and send all necessary data needed to operate the vehicle and start the engine. Again referring to FIG. 3, note the presence of the serial data T-Harness connector 23. The serial data T-Harness connector routes the serial data lines 22 from the electronic ignition cylinder 20 to the remote starter module 25. Additionally the serial data T-Harness connector 23 routes signals from the remote starter module 25 to other modules in the vehicle, such as the engine controller 33, transmission controller 34, heater/AC controller 35, and other controllers 36. Finally, note that the serial data T-Harness connector 23 also accesses the same power leads 21 normally used to power the electronic ignition cylinder 20 and uses this power to power the remote starter module 25. Thus the embodiment allows a complete remote starter system 100 to be easily and quickly installed in a vehicle without any need for further wire connections.

Figure 4:
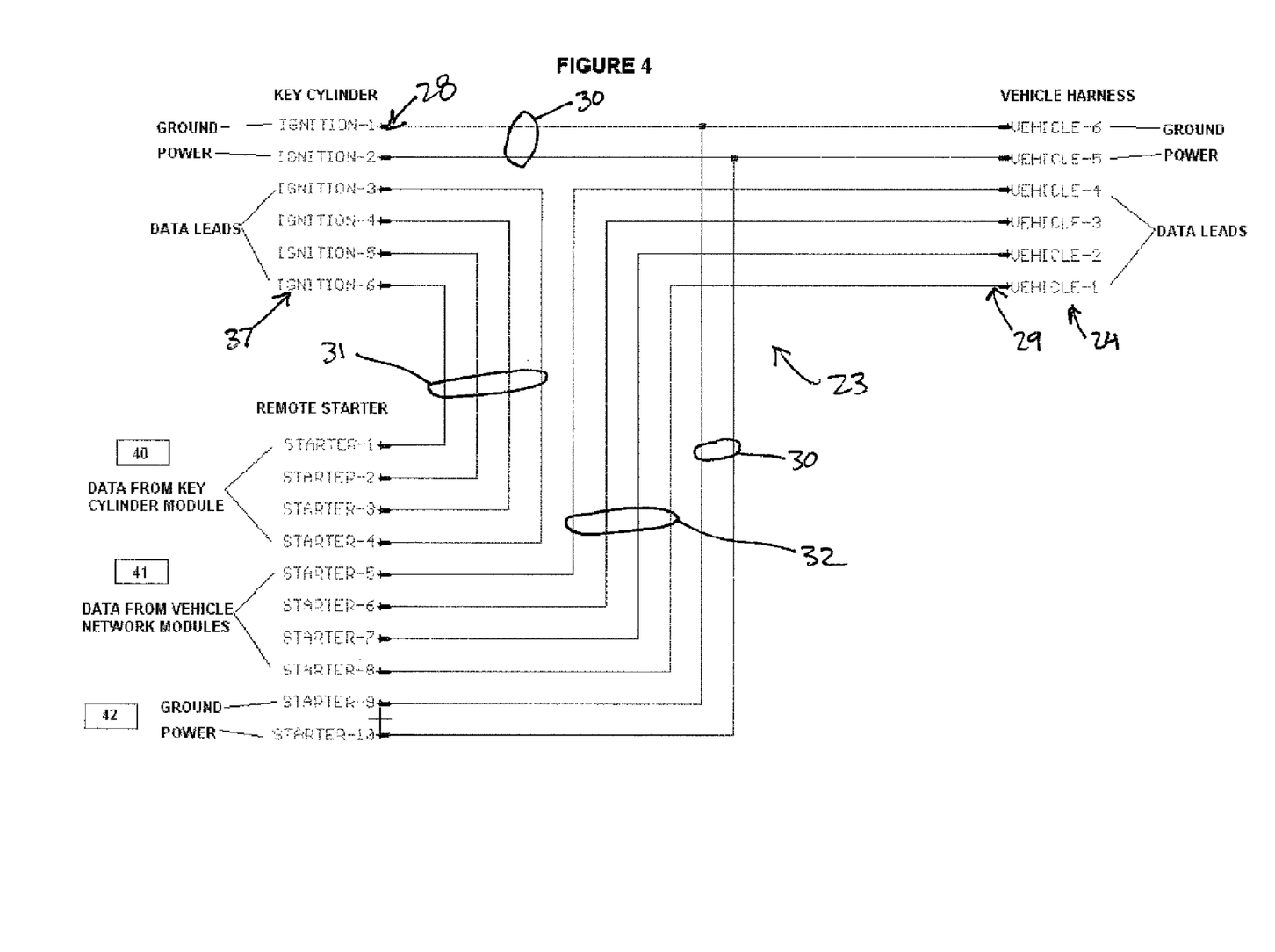
FIG. 4 is a schematic diagram of the invention.

Referring now also to FIG. 4 and as mentioned in FIG. 3, a vehicle system which consists of an electronic ignition cylinder 20, and many other vehicle control modules, each which performs a specific task that is required for the vehicle to function are illustrated. For the purposes of the embodied invention three modules are depicted; the engine controller 33, the transmission controller 34, and the heater/AC controller 35. All modules in the vehicle are connected with one or more serial data networks such as CANBUS, FLEXRAY, LIN or MOST. The vehicle network which connects all the modules consists of power leads 21, and serial data leads 22. The power leads supply power to each module while the data leads carry data packets between the various modules throughout the network. Under normal operation vehicle state is changed by sending specific data packets from one module to one or many different modules on the network. For the purposes of the embodied invention it is useful to describe how the electronic ignition cylinder changes vehicle state. When an authorized key is turned in the electronic ignition cylinder 20, a data packet is sent along the data leads 22 to the engine controller 33, which instructs the engine controller to start the vehicle engine. The electronic ignition cylinder is typically connected to the vehicle network by means of a set of locking connectors. The electronic ignition cylinder typically terminates in a locking connector of a specific gender, in the depicted embodiment, a male locking connector 37 is described. This locking connector is mated to an opposite gender connector which terminates the vehicle network harness which in the depicted embodiment is a female locking connector 24. Naturally an alternate form of the described embodiment may have the female connector terminating the electronic ignition cylinder and the male connector terminating the vehicle harness and it is intended that these differences do not violate the scope of the embodied invention.

The remote starter system 100 is installed by locating the locking connectors 24 and 37 and disconnecting them. The T-Harness connector 23 is then inserted in between the corresponding connectors. The T-Harness connector 23 consists of a set of lead wires, a first set 30, a second set 31, and a third set 32 terminating in three sets of connectors (a first connector 26, a second 28, and a third 29). Two of the three connectors (the second connector 28 and the third connector 29) are designed to mate with the previously disconnected connectors (locking connectors 24 and 37) of the previously described vehicle system. Specifically, when the locking connectors 24,37 are separated, One connector of the invention (the second connector 28) is designed to connect to the disconnected locking connector 37 that terminates at the electronic ignition cylinder 20. Similarly another connector (the third connector 29) is designed to connect to the other disconnected locking connector 24 that terminates at the vehicle harness which connects to the various controllers (33-36) on the vehicle network. The first connector 26 is designed to mate to a matching but opposite gender connector 27 on the remote starter module 25. This therefore describes a single point of connection within the vehicle network to be redirected to the remote starter module for the purpose of reading and modifying the vehicle state, which in turn allows the vehicle functions specific to starting and running the engine and operating the heater or air conditioning to be controlled by the remote start module.

The embodied invention accomplishes this by redirecting the serial data lines 22 originating from the electronic ignition cylinder 20 into the T-Harness connector 23 between the electronic ignition cylinder locking connector 37 and the opposite gender locking connector of the second connector 28. The serial data lines 31 then continue to the connection point between the T-Harness connector 23 and the remote starter module 25 consisting of the first connector 26 and the opposite gender connector of the remote starter 27. This allows data packets originating in the electronic ignition cylinder and destined for any other module on the vehicle network to be routed to the remote start module instead. Once the data packets are processed within the remote starter module 25, they re-enter the T-Harness connector 23 through the first connector 26 and are routed along wire leads 32 to the connection point between the T-Harness connector 23 and the vehicle network harness consisting of third connector 29 and the opposite gender locking connector 24 that terminates the vehicle harness. This allows packets sent from the remote starter module to re-enter the vehicle network harness and reach any other module on the vehicle network, including the engine controller 33, transmission controller 34, and heater/AC controller 35.

Alternately it is understood that packets may traverse the opposite route, originating at any module on the vehicle network and passing through the invention to reach the remote starter module before re-entering the invention to terminate at the electronic ignition cylinder. Since all relevant vehicle state changes originate as data packets traveling on the network as opposed to voltage changes on discrete wires (e.g. one wire carries one state change), the embodiments allows all relevant state changes to be controlled by diverting the vehicle network data lines through the remote starter module at the connection point between the electronic ignition cylinder and the vehicle network. The electronic ignition cylinder may also verify the correct vehicle key is present via radio frequency communication.

In another embodiment of the invention, there is provided a remote starter system for a vehicle having an ignition module that is connected to other vehicle controller modules by a serial data interface. The remote starter may communicate wirelessly to a remote keyless entry device, sometimes provided by the manufacturer of the vehicle, or a specifically designed keyless entry device manufactured for use with the remote starter, or the remote starter may communicate with a specifically designed telephone application. The remote starter system received commands from the remote/telephone and directs the vehicle to complete various tasks or operations, such as but not limited to starting the car, turning on the transmission, turning on air or heat control system, turning on seat warming devices, etc.

The serial data interface would typically have serial data wires and power supply wires and a pair of interconnected vehicle serial data connectors. The remote starter system includes a T-Harness connector and a remote starter module. The T-Harness connector includes at least first, second, and third serial data connectors. The T-Harness connector includes power supply wires separating connecting the first, second, and third serial data connectors to each other. And the T-Harness connector includes serial data wires connecting only the first and second serial data connectors together and then separately connecting the first and third serial data connectors. Once the T-Harness connector is installed, the second and third serial data connectors would be separately coupled between the pair of interconnected vehicle serial data connectors.

The remote starter module has at least a remote starter connector. The first serial data connector of the T-Harness connector is coupled to the remote starter connector, whereby serial data from the vehicle controller modules and from the ignition modules must communication through the remote starter.

Additionally the invention allows power to be routed from the vehicle network harness for the purpose of supplying the remote starter module with operating power. This is accomplished by routing the vehicle network power supply and ground leads as they enter the invention at third connector 29. The power leads 30 are then routed to both the electronic ignition cylinder 20 through connectors 28 and 37 that connect the T-Harness connector 23 to the electronic ignition cylinder and the remote starter module via the first connector 26. Naturally the described embodiments can have many physical embodiments and that those skilled in the art may be able to make minor changes to the invention. One such example of a minor change is that the electronic ignition cylinder connection point to the vehicle network harness may consist of two (2) sets of connectors instead of just one connector and the network data leads or power leads can be spread across both connectors. The resulting embodiment of the invention would then have 5 total connection points instead of 3: Two connection points would mate with the electronic ignition cylinder, two connection points would mate with the vehicle network harness, and one connection point would mate with the remote starter module. Another example of a minor change would be that the vehicle network harness may consist of addition leads that are not relevant to the purpose of the embodied invention. In such a case, those leads will simply pass from vehicle harness mating locking connector to the electronic ignition cylinder locking connector without being sent to the remote starter module connector. It is intended that any of these changes do not violate the spirit of the invention and do not change the function of the invention and therefore are within the scope of this invention.

I claim:

1. A remote starter system for a vehicle having an ignition module connected to vehicle controller modules by a serial data interface, the serial data interface having vehicle serial data wires and vehicle power supply wires and the serial data interface having a pair of interconnected vehicle serial data connectors to communicate serial data and power to and from the vehicle controller modules and the ignition module through the vehicle serial data wires and vehicle power supply wires, the remote starter system comprising:
    a T-Harness connector having T-Harness serial data wires and T-Harness power supply wires and having at least first, second, and third serial data connectors, the second and third serial data connectors being interconnected between the pair of vehicle serial data connectors, wherein:
        the T-Harness serial data wires being configured to communicate only between the first and second serial data connectors and only between the first and third serial data connectors, such that all of the serial data to and from the second and third serial data connectors must communicate through the first serial data connector;
        the T-Harness power supply wires being configured to, communicate between the first and second serial data connectors, between the first and third serial data connectors, and between the second and third serial data connectors; and
    a remote starter module having at least a remote starter connector, wherein the first serial data connector of the T-Harness connector is coupled to the remote starter connector, whereby all of the serial data from the vehicle controller modules and from the ignition module must communicate through the remote starter module before being communicated to the vehicle controller modules and to the ignition module.

2. The remote starter system of claim 1, wherein the ignition module sends and receives information as data packets to one or more of the following controllers permitting the vehicle to change operation states:
    an engine controller, wherein the change in operating state is starting and running the engine;
    a transmission controller, wherein the change in operating state is unlocking the transmission permitting vehicle movement; or
    a heater/air conditioning controller, wherein the change in operating state is turning on the heater/air conditioning.

3. A remote starter system for a vehicle having an ignition module connected to vehicle controller modules by a serial data interface, the serial data interface having an interconnected pair of vehicle serial data connectors, the remote starter system comprising:
    a T-Harness connector having at least a first, second, and third serial data connectors, wherein the second and third serial data connectors are further interconnected between the pair of vehicle serial data connectors, and the T-Harness connector further having at least serial data wires specifically configured to communicate all serial data to and from the second and third serial data connectors through the first serial data connector; and
    a remote starter module having at least a remote starter connector, wherein the first serial data connector of the T-Harness connector is coupled to the remote starter connector, and the second and third serial data connectors are separately coupled between the pair of interconnected vehicle serial data connectors, such that all of the serial data from the vehicle controller modules and from the ignition module must communicate through the remote starter module before being communicated to the vehicle controller modules and to the ignition module.

4. The remote starter system of claim 3, wherein the serial data interface is a serial data bus, CANBUS, FLEXRAY, UN or MOST.

5. The remote starter system of claim 3, wherein the vehicle controller modules are an engine controller, heat controller, air conditioning controller, or transmission system controller.

6. The remote starter system of claim 3, wherein the ignition module is an electronic device with a receptacle where an ignition key is inserted to allow access to vehicle functions.

7. The remote starter system of claim 3, wherein the ignition module is a "push to start" button switch.

8. The remote starter system of claim 3, wherein the ignition module sends and receives information as data packets to one or more of the following controllers permitting the vehicle to change operation states:
    an engine controller, wherein the change in operating state is starting and running the engine;
    a transmission controller, wherein the change in operating state is unlocking the transmission permitting vehicle movement; or
    a heater/air conditioning controller, wherein the change in operating state is turning on the heater/air conditioning.

9. The remote starter system of claim 3, wherein the T-Harness connector is a break in the serial data lines re-directing the serial data lines to the remote starter system for modification of the data packets.

10. The remote starter system of claim 3, wherein the T-Harness connector is further configured to route serial data lines and power lines to the remote starter module for purposes of access to power supply and data packets.

11. The remote starter system of claim 3, wherein the T-Harness connector is further configured to route a vehicle ground reference line to the remote starter module.

12. The remote starter system of claim 3, wherein the T-Harness connector is further configured to route a vehicle power supply to the remote starter module.

13. The remote starter system of claim 3, wherein the T-Harness connector is further configured to route the serial data lines from the ignition module to the remote starter module.

14. The remote starter system of claim 3, wherein the T-Harness connector is further configured to route the serial data lines from a vehicle data network to the remote starter module.

15. The remote starter system of claim 3, wherein the T-Harness connector requires all data packets moving between the ignition module and the vehicle controller modules must communicate through the remote starter module.

16. The remote starter system of claim 3, wherein the T-Harness connector permits the remote starter module to control the movement of data packets.

17. A remote starter system for a vehicle having an ignition module connected to vehicle controller modules by a serial data interface, the serial data interface having a pair of interconnected vehicle serial data connectors, the remote starter system comprising:

a T-Harness connector having at least first, second, and third serial data connectors, and having serial data wires being configured to communicate only between the first and second serial data connectors and only between the first and third serial data connectors, such that all of the serial data to and from the second and third serial data connectors must communicate through the first serial data connector; and a remote starter module having at least a remote starter connector, wherein the first serial data connector of the T-Harness connector is coupled to the remote starter connector, and the second and third serial data connectors are separately coupled between the pair of interconnected vehicle serial data connectors, such that data from the remote starter module is communicated to the vehicle controller modules and the ignition module and wherein all data packets moving between the ignition module and the vehicle controller modules must communicate through the remote starter module before being communicated to the vehicle controller modules and to the ignition module.

18. The remote starter system of claim 17, wherein the serial data interface is a serial data bus, CAN BUS, FLEXRAY, LIN or MOST.

19. The remote starter system of claim 17, wherein the ignition module sends and receives information as data packets to one or more of the following controllers permitting the vehicle to change operation states:

an engine controller, wherein the change in operating state is starting and running the engine;

a transmission controller, wherein the change in operating state is unlocking the transmission permitting vehicle movement; or a heater/air conditioning controller, wherein the change in operating state is turning on the heater/air conditioning.

20. The remote starter system of claim 17, wherein the T-Harness connector routes serial data lines and power lines to the remote starter module for purposes of access to power supply and data packets.

* * * * *